(12) United States Patent
Orlamünder

(10) Patent No.: US 6,279,709 B1
(45) Date of Patent: Aug. 28, 2001

(54) MULTI-PLATE CLUTCH FOR A MOTOR VEHICLE

(75) Inventor: Andreas Orlamünder, Schweinfurt (DE)

(73) Assignee: Mannesmann Sachs AG, Schweinfurt (DE)

( * ) Notice: Subject to any disclaimer, the term of this patent is extended or adjusted under 35 U.S.C. 154(b) by 0 days.

(21) Appl. No.: 09/475,553

(22) Filed: Dec. 30, 1999

(30) Foreign Application Priority Data

Feb. 3, 1999 (DE) .............................................. 199 04 136

(51) Int. Cl.[7] .............................. F16D 13/56; F16D 13/72
(52) U.S. Cl. .................................... 192/70.12; 192/70.28; 192/89.23; 192/113.21; 192/113.25
(58) Field of Search .............................. 192/70.12, 70.28, 192/89.23, 113.2, 113.21, 113.22, 113.23, 113.24, 113.25, 113.26

(56) References Cited

U.S. PATENT DOCUMENTS

| | | | |
|---|---|---|---|
| 2,600,520 | * 6/1952 | Spase | 192/70.28 X |
| 3,174,602 | * 3/1965 | Schjolin | 192/70.28 X |
| 3,994,378 | * 11/1976 | Schwabe et al. | 192/70.28 |
| 4,940,124 | * 7/1990 | Galuska et al. | 192/70.28 |
| 5,638,932 | * 6/1997 | Mizukami | 192/70.12 |

* cited by examiner

Primary Examiner—Richard M. Lorence
(74) Attorney, Agent, or Firm—Cohen, Pontani, Lieberman & Pavane

(57) ABSTRACT

A multi-plate clutch for a motor vehicle has a U-shaped spring element fastened to an intermediate plate for holding adjacent pressure plates at a distance from one another. The intermediate plate is reliably held between the pressure plates. Grinding of friction facings arranged between the intermediate plate and the pressure plates is accordingly minimized. The spring element is arranged in an area of an external toothing of the intermediate plate and therefore does not contribute to an increase in the radial dimensions of the multi-plate clutch.

21 Claims, 3 Drawing Sheets

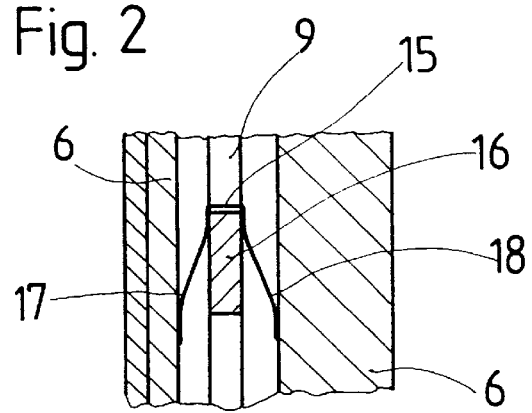
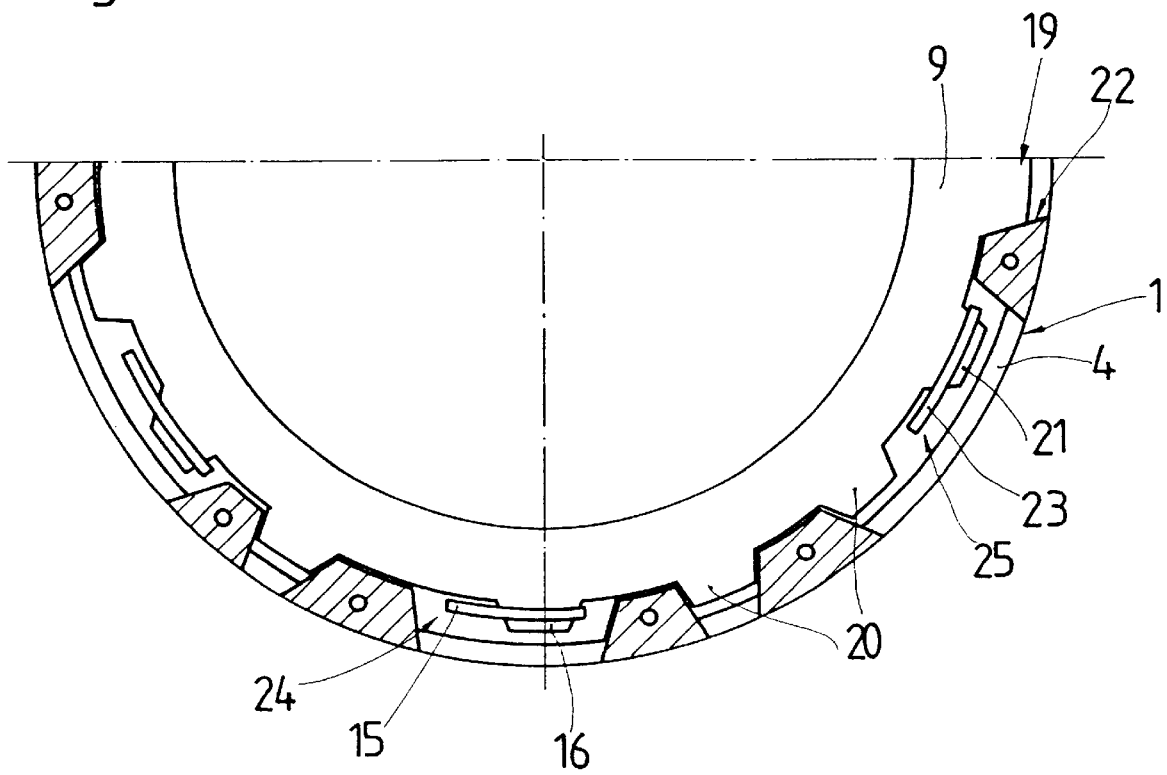

MULTI-PLATE CLUTCH FOR A MOTOR VEHICLE

BACKGROUND OF THE INVENTION

1. Field of the Invention

The present invention is directed to a multi-plate clutch for a motor vehicle with at least one intermediate plate arranged between friction facings, two pressure plates for pretensioning the friction facings toward the intermediate plate, and a spring element for separating the pressure plates and the intermediate plate from the friction facings.

2. Description of the Related Art

Multi-plate clutches are characterized in that they are capable of transmitting high torques. The known multi-plate clutch has a plurality of spring elements arranged radially outside of the intermediate plate for pressing apart the pressure plates. When the pressure plates are spread apart by the spring elements, no transmission of torque should take place between a shaft which is connected with the friction facings so as to be fixed with respect to rotation relative to them and a shaft connected with the pressure plates.

A disadvantage in this known arrangement for a known multi-plate clutch is that the intermediate plate is not reliably separated from the friction facings. The lack of reliable separation leads to high wear of the friction facings and to an unnecessary heating of the friction facings. The heat generated in this respect must subsequently be removed from the multi-plate clutch in a costly manner. Further, the drag torque brought about by the grinding of the friction facings puts a strain on a synchronization device of a transmission arranged downstream.

SUMMARY OF THE INVENTION

It is an object of the present invention to provide a multi-plate clutch in which the grinding of the friction facings is minimized while the pressure plates are separated.

This object of the present invention is met by an arrangement of spring elements that contact each of the intermediate plates and the pressure plates.

As a result of this arrangement, each of the intermediate plates and the pressure plates are pressed apart by the spring elements. The springs ensure that a sufficient gap exists between each of the intermediate plates and pressure plates when the multi-plate clutch is in the disengaged state so that the friction facing arranged in the gap can rotate freely. The friction facings are therefore separated particularly reliably from the intermediate plate and pressure plates. Accordingly, the multi-plate clutch according to the invention exhibits particularly low wear.

According to an embodiment of the present invention, the spring elements of the multi-plate clutch are fastened to the intermediate plate.

According to another embodiment of the present invention, the spring elements have a U-shaped bend for clamping the intermediate plate. Alternatively, the spring elements may also be clamped to one of the pressure plates.

According to another embodiment of the present invention, the spring elements include projecting spring tongues. The spring elements may have individual spring tongues or spring tongues located opposite one another. When the multi-plate clutch includes an individual intermediate plate, this intermediate plate is held reliably in the center between the pressure plates by the spring elements having spring tongues located opposite one another. When the multi-plate clutch includes a plurality of intermediate plates, a sufficient result is achieved when some of the spring elements have only one individual spring tongue. This embodiment ensures that the intermediate plates are held at a distance from one another with the same spring force in each instance.

In yet a further embodiment, a particularly large spring path may be generated in that the spring tongues are S-shaped.

Heat generated in the multi-plate clutch according to the invention may be guided away when the pressure plates have cooling lugs penetrating an opening in a clutch housing.

Heat generated in the multi-plate clutch according to the invention may also be guided away in a simple manner when a housing cover arranged in front of one of the pressure plates has ventilation slits. This contributes to a further reduction of the temperature level inside the clutch and accordingly to a further reduction in wear of the friction facings.

The guiding of heat from the multi-plate clutch according to the invention is further improved in that venting blades are arranged in front of the ventilation slits.

A continuous delivery of cooling air through the multi-plate clutch according to the invention may further be achieved by arranging venting blades in a diaphragm spring which pretensions the pressure plates toward the friction facings.

The known arrangement of spring elements for separating the pressure plate in an area located radially outside of the intermediate plate adds to the radial dimension of the clutch. Accordingly, the known multi-plate clutch having spring elements has a large radial diameter. In contrast to the known arrangement, the radial dimensions of the present invention may be kept particularly small in that the spring elements are arranged in a radial area of an external toothing of the intermediate plate.

To further reduce the radial dimensions of the multi-plate clutch according to the invention, an internal toothing of the housing engaging in the external toothing of the intermediate plate has recesses in the area of the spring elements.

According to another advantageous development of the invention, the spring elements require no installation space in the radial direction when the spring elements have dimensions corresponding to the radial dimensions of the external toothing of the intermediate plate. Since the external toothing is already present between the intermediate element and the housing, and since a very large number of spring elements can be used in this area, spring tongues with a width corresponding to the external toothing of the intermediate plate can be used without difficulty.

According to another advantageous further development of the invention, the spring elements are reliably held in their provided position at the pressure plate or intermediate plate when the spring elements are arranged so as to engage around a tooth of the external toothing.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings, wherein like reference characters denote similar elements throughout the several views:

FIG. 2 is a sectional view showing the clutch shown in FIG. 1 along line II—II;

FIG. 3 is a sectional view of a lower half of in FIG. 1 along line III—III; and

DETAILED DESCRIPTION OF THE PRESENTLY PREFERRED EMBODIMENTS

Figure 1:
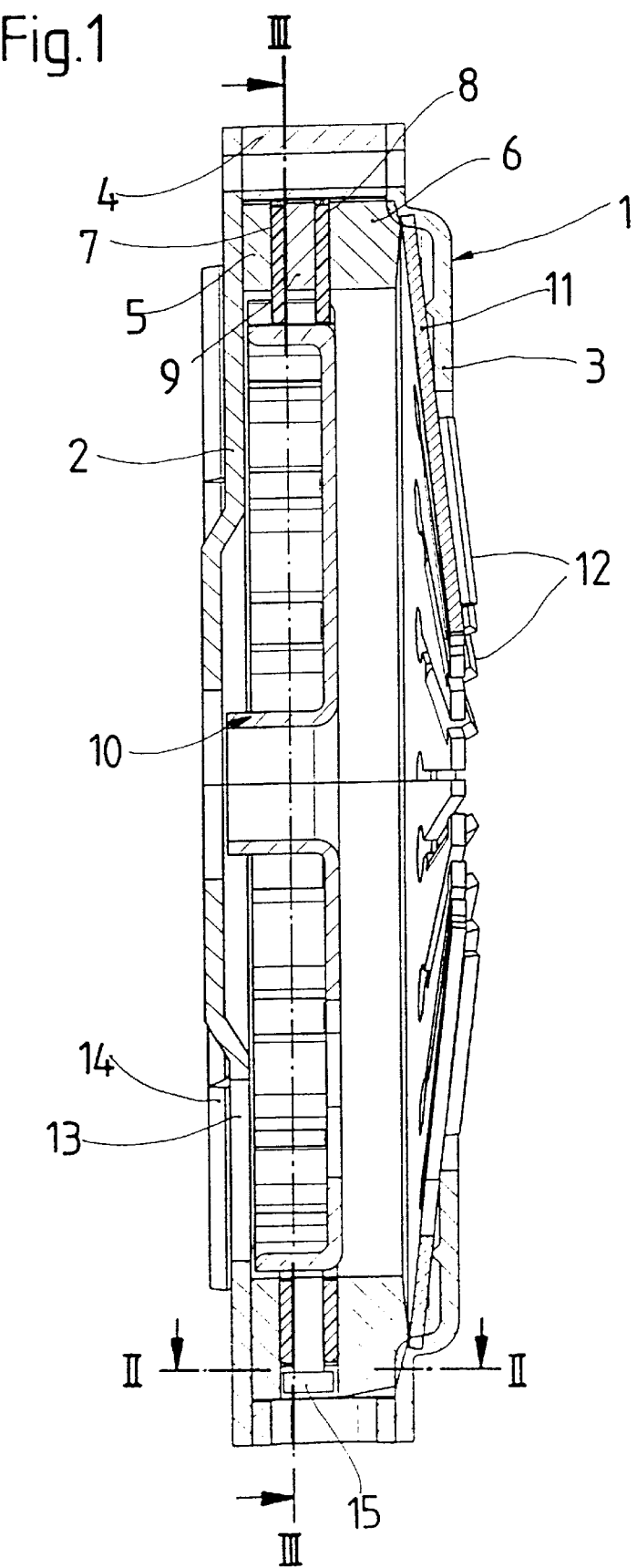
FIG. 1 is a longitudinal sectional view of a multi-plate clutch according to an embodiment of the present invention.

FIG. 1 shows a longitudinal section of a multi-plate clutch 100 according to the invention with a housing 1. The housing 1 includes a housing ring 4 arranged between first and second housing covers 2, 3. First and second pressure plates 5, 6 for pretensioning first and second friction facings 7, 8 toward an intermediate plate 9 are arranged in the housing 1. The intermediate plate 9 and the first and second pressure plates 5, 6 are connected with the housing ring 4 so that they are fixed with respect to rotation relative to the housing ring 4. The first and second friction facings 7, 8 are fastened to a hub 10 so that they are fixed with respect to rotation and axially displaceable relative to the hub 10. The second pressure plate 6 contacts a diaphragm spring 11. The diaphragm spring 11 has venting blades 12 for conveying cooling air through the housing 1 to ventilation slits 13 of the housing cover 2 located opposite the diaphragm spring 11. The housing cover 2 likewise has venting blades 14 in the area of the ventilation slits 13.

The second pressure plate 6 arranged adjacent to the diaphragm spring 11 is pretensioned toward the second friction facing 8 by the diaphragm spring 11 which is supported at the second housing cover 3. The second friction facing 8 displaces the intermediate plate 9 toward the first friction facing 7 until it is located against the first pressure plate 5. This produces a frictional engagement of the housing 1 on the hub 10. To separate the first and second friction facings 7, 8 from the intermediate plate 9 and the first and second pressure plates 5, 6, the diaphragm spring 11 is first swiveled until the second pressure plate 6 contacting it is moved away from the second friction facing 8. This interrupts the frictional engagement of the housing 1 with the hub 10. A spring element 15 is fastened in a radial outer area of the intermediate plate 9. The spring element 15 is supported at the first and second pressure plates 5, 6.

The radial outer area of the multi-plate clutch 100 is shown in an enlarged view in FIG. 2. As shown in FIG. 2, the spring element 15 is bent so that it is U-shaped and is arranged so that it engages around (i.e., clamps) a tooth 16 of the intermediate plate 9. The tooth 16 faces radially outward. The spring element 15 has first and second spring tongues 17, 18 supported at the first and second pressure plates 5, 6. The first and second spring tongues are arranged so that when the first and second pressure plates 5, 6 move apart, the intermediate plate 9 is moved along and is reliably held in the middle between the first and second pressure plates 5, 6.

FIG. 3 shows the lower half sectional view of the multi-plate clutch of FIG. 1 along line III—III of FIG. 1. The intermediate plate 9 has an external toothing 19 with a plurality of teeth 16, 20, 21 which face outward radially. The housing ring 4 has an internal toothing 22 corresponding to the external toothing 19. The external toothing 19 and the internal toothing 22 are meshed to fix the intermediate plate 9 at the housing ring 4 with respect to rotation and to allow axial displacement of the intermediate plate 9 relative to the housing ring 4. FIG. 3 further shows the spring element 15 shown in FIG. 1 and another spring element 23 arranged on a tooth 21. Both spring elements 15 and 23 are supported at the first and second pressure plates 5, 6 shown in FIGS. 1 and 2. The housing ring 4 has recesses 24, 25 in the area of the spring elements 15, 23. The arrangement of the spring elements 15, 23 on the toothing 19 allows the radial dimensions of the multi-plate clutch to be maintained in contrast to the prior art which requires that the radial dimensions be increased.

Instead of having one intermediate plate 9, the multi-plate clutch of FIGS. 1–3 may have a plurality of intermediate plates, with every second one of these plural intermediate plate proceeding from one side provided with the spring element 15 described in FIGS. 1 to 3. However, when there is an even number of intermediate plates, it is advantageous for the purpose of uniform spacing of the intermediate plates when spring elements, each having an individual spring tongue, are arranged at each one of the intermediate plates, respectively. Of course, the multi-plate clutch may also be outfitted with a torsional vibration damper or fastened to the secondary side of a dual-mass flywheel to eliminate torsional vibrations from the drivetrain.

Figure 4:
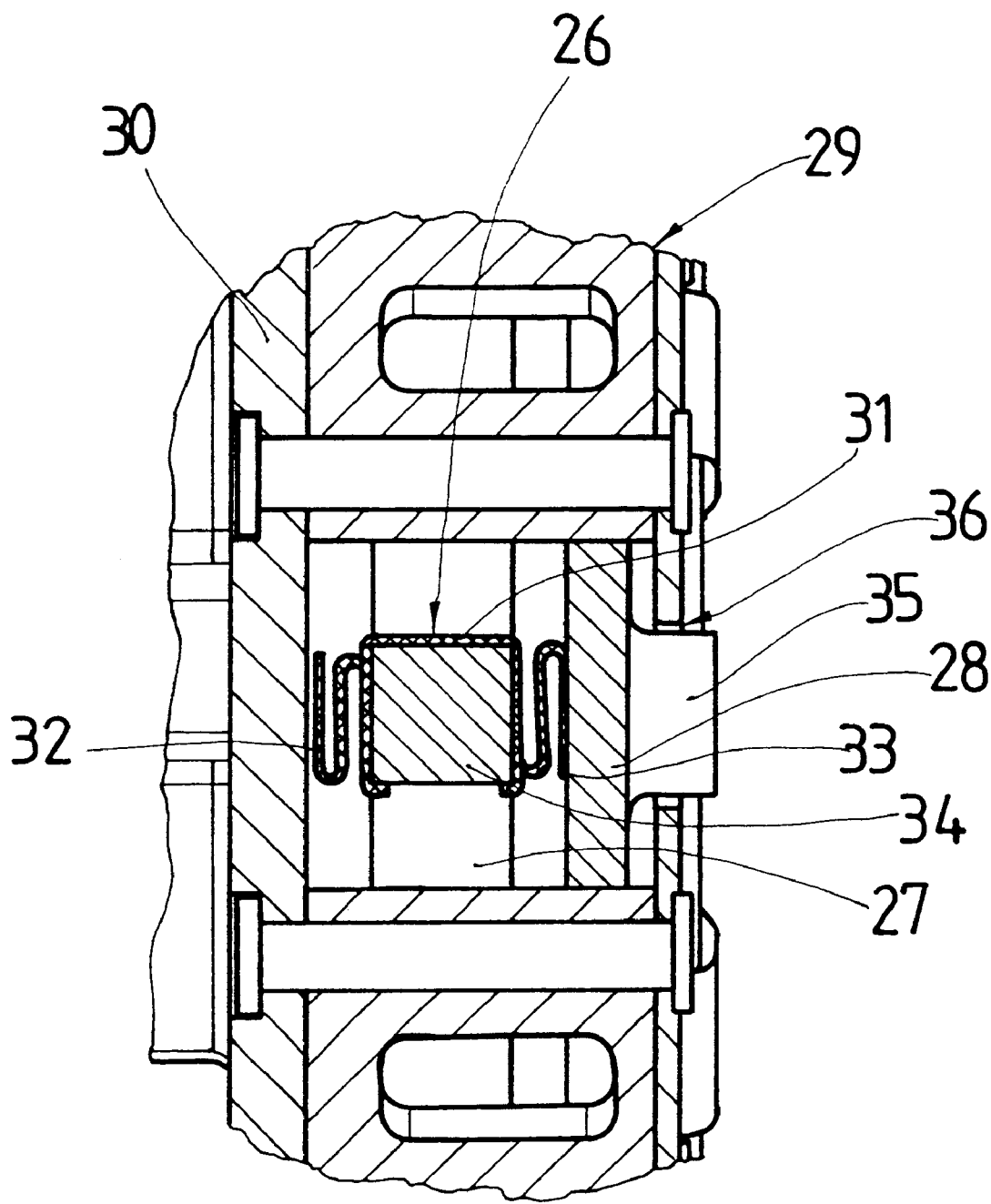
FIG. 4 is a tangential section through a radial outer area of another embodiment of the multi-plate clutch according to the invention showing the arrangement of a spring element on a tooth of the intermediate element.

FIG. 4 shows another embodiment of the multi-plate clutch 100' according to the present invention in a tangential section through an external toothing 26 of an intermediate plate 27. The intermediate plate 27 and a first pressure plate 28 are guided so as to be axially displaceable in a housing 29 of the multi-plate clutch. A second pressure plate 30 is constructed as part of the housing 29. The intermediate plate 27 and the first and second pressure plates 28, 30 are pressed apart by a spring element 31 with oppositely located spring tongues 32, 33. The spring tongues 32, 33 are S-shaped. The spring element 31 engages around a tooth 34 of the external toothing 26 of the intermediate plate 27. The displaceable pressure plate 28 carries the housing 29 in the area of cooling lugs 35 which penetrate through openings 36 in the housing 29.

The invention is not limited by the embodiments described above which are presented as examples only but can be modified in various ways within the scope of protection defined by the appended patent claims.

I claim:

1. A multi-plate clutch for a motor vehicle, comprising:
a housing having first and second cover plates and a housing ring connecting radial outer ends of said first and second cover plates, said housing being rotatable about an axis of rotation;
an intermediate plate arranged for rotating about said axis of rotation with said housing;
first and second friction facings arranged on opposing sides of said intermediate plate and arranged on a hub rotatable about said axis of rotation relative to said intermediate plate;
first and second pressure plates arranged in said housing on opposing sides of said intermediate plate for rotation with said intermediate plate and said housing about said axis of rotation and axially movable along said axis of rotation relative to said intermediate plate for pretensioning said first and second friction facings toward the intermediate plate; and
a spring element arranged for separating said first and second pressure plates and said intermediate plate from said first and second friction facings, wherein said spring element contacts each of said intermediate plate and said first and second pressure plates, and wherein at least one of said first and second pressure plates comprises cooling lugs penetrating an opening in one of said first and second cover plates of said housing.

2. The multi-plate clutch of claim 1, wherein said spring element is fastened to said intermediate plate.

3. The multi-plate clutch of claim 1, wherein said spring element comprises a U-shaped bend for clamping said intermediate plate or one of said first and second pressure plates.

4. The multi-plate clutch of claim 1, wherein said spring element comprises projecting spring tongues.

5. The multi-plate clutch of claim 4, wherein said projecting spring tongues are S-shaped.

6. The multi-plate clutch of claim 1, further comprising a diaphragm spring operatively arranged for pretensioning said first and second pressure plates toward said first and second friction facings, wherein said diaphragm spring comprises venting blades.

7. The multi-plate clutch of claim 1, wherein said intermediate plate and said first and second pressure plates each comprise an external toothing directed radially outward, said spring element being arranged on one of said intermediate plate and said first and second pressure plates in an area of said external toothing.

8. The multi-plate clutch of claim 7, wherein said housing ring of said housing comprises an internal toothing engaging the external toothing of said intermediate plate and having recesses in an area of said spring element.

9. The multi-plate clutch of claim 7, wherein said spring element comprises dimensions corresponding to radial dimensions of said external toothing of said one of said intermediate plate and said first and second pressure plates.

10. The multi-plate clutch of claim 7, wherein said spring element is arranged around a tooth of said external toothing.

11. A multi-plate clutch for a motor vehicle, comprising:

a housing having first and second cover plates and a housing ring connecting radial outer ends of said first and second cover plates, said housing being rotatable about an axis of rotation;

an intermediate plate arranged for rotating about said axis of rotation with said housing;

first and second friction facings arranged on opposing sides of said intermediate plate and arranged on a hub rotatable about said axis of rotation relative to said intermediate plate;

first and second pressure plates arranged in said housing on opposing sides of said intermediate plate for rotation with said intermediate plate and said housing about said axis of rotation and axially movable along said axis of rotation relative to said intermediate plate for pretensioning said first and second friction facings toward the intermediate plate; and a spring element arranged for separating said first and second pressure plates and said intermediate plate from said first and second friction facings, wherein said spring element contacts each of said intermediate plate and said first and second pressure plates, and wherein said first housing cover arranged in front of said first pressure plate comprises ventilation slits.

12. The multi-plate clutch of claim 11, wherein said first housing cover further comprises venting blades arranged in front of said ventilation slits.

13. The multi-plate clutch of claim 11, wherein said spring element is fastened to said intermediate plate.

14. The multi-plate clutch of claim 11, wherein said spring element comprises a U-shaped bend for clamping said intermediate plate or one of said first and second pressure plates.

15. The multi-plate clutch of claim 11, wherein said spring element comprises projecting spring tongues.

16. The multi-plate clutch of claim 15, wherein said projecting spring tongues are S-shaped.

17. The multi-plate clutch of claim 11, further comprising a diaphragm spring operatively arranged for pretensioning said first and second pressure plates toward said first and second friction facings, wherein said diaphragm spring comprises venting blades.

18. The multi-plate clutch of claim 11, wherein said intermediate plate and said first and second pressure plates each comprise an external toothing directed radially outward, said spring element being arranged on one of said intermediate plate and said first and second pressure plates in an area of said external toothing.

19. The multi-plate clutch of claim 18, wherein said housing ring of said housing comprises an internal toothing engaging the external toothing of said intermediate plate and having recesses in an area of said spring element.

20. The multi-plate clutch of claim 18, wherein said spring element comprises dimensions corresponding to radial dimensions of said external toothing of said one of said intermediate plate and said first and second pressure plates.

21. The multi-plate clutch of claim 18, wherein said spring element is arranged around a tooth of said external toothing.

\* \* \* \* \*